(12) United States Patent
Yerton et al.

(10) Patent No.: US 9,357,750 B2
(45) Date of Patent: Jun. 7, 2016

(54) PET CHEW TOY

(71) Applicant: R2P Group, Inc., Emeryville, CA (US)

(72) Inventors: Nicholas R. Yerton, Oakland, CA (US); David C. Woodward, Kowloon (CN)

(73) Assignee: R2P Group, Inc., Emeryville, CA (US)

(*) Notice: Subject to any disclaimer, the term of this patent is extended or adjusted under 35 U.S.C. 154(b) by 0 days.

(21) Appl. No.: 13/770,999

(22) Filed: Feb. 19, 2013

(65) Prior Publication Data

US 2014/0230752 A1    Aug. 21, 2014

(51) Int. Cl.
*A01K 15/02*    (2006.01)
*A01K 11/00*    (2006.01)
*A23K 1/00*     (2006.01)
*A23K 1/10*     (2006.01)
*A23K 1/18*     (2006.01)

(52) U.S. Cl.
CPC .............. *A01K 15/026* (2013.01); *A23K 1/004* (2013.01); *A23K 1/106* (2013.01); *A23K 1/1853* (2013.01)

(58) Field of Classification Search
CPC ... A01K 15/025; A01K 15/026; A23K 1/004; A23K 1/10; A23K 1/106; A23K 1/1853

USPC ........................................ 119/707, 709–711
IPC ............................................ A01K 29/00,15/02
See application file for complete search history.

(56) References Cited

U.S. PATENT DOCUMENTS

| 2,185,547 | A  | * | 1/1940  | Fowler .......................... 119/709 |
| 5,947,061 | A  | * | 9/1999  | Markham et al. ............. 119/710 |
| 6,277,420 | B1 | * | 8/2001  | Andersen et al. .............. 426/92 |
| 6,312,746 | B2 | * | 11/2001 | Paluch .......................... 426/282 |
| 6,439,166 | B1 | * | 8/2002  | Markham ...................... 119/710 |
| 6,546,896 | B1 | * | 4/2003  | Markham ...................... 119/709 |
| 6,584,938 | B2 | * | 7/2003  | Sherrill et al. ................. 119/710 |
| 7,851,001 | B2 | * | 12/2010 | Axelrod ........................ 426/132 |
| 7,909,003 | B2 | * | 3/2011  | Willinger ...................... 119/711 |
| 7,950,353 | B2 | * | 5/2011  | Axelrod et al. ............... 119/709 |
| 8,033,253 | B2 | * | 10/2011 | Ritchey et al. ................ 119/707 |
| 8,161,914 | B2 | * | 4/2012  | Adkins et al. ................. 119/710 |
| 8,312,844 | B2 | * | 11/2012 | Mann ............................ 119/709 |
| 2008/0118606 | A1 | * | 5/2008 | Stern .............................. 426/92 |
| 2009/0235872 | A1 | * | 9/2009 | Filipi et al. .................... 119/710 |
| 2010/0224138 | A1 | * | 9/2010 | Axelrod et al. ............... 119/710 |
| 2013/0036988 | A1 | * | 2/2013 | Lai ................................ 119/709 |

* cited by examiner

*Primary Examiner* — Kathleen Alker
(74) *Attorney, Agent, or Firm* — Rathe Lindenbaum LLP

(57) ABSTRACT

A pet chew toy comprises a layer of animal product about a core.

13 Claims, 10 Drawing Sheets

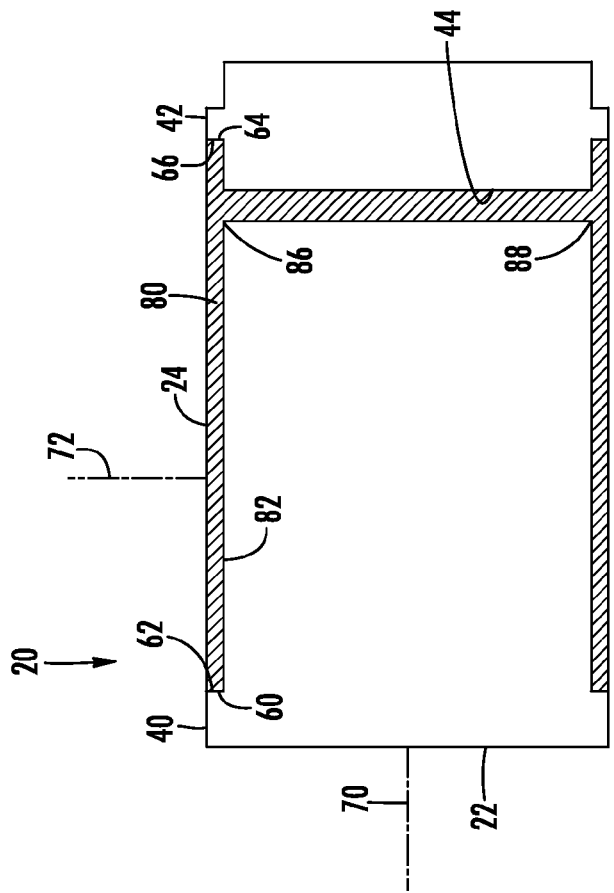
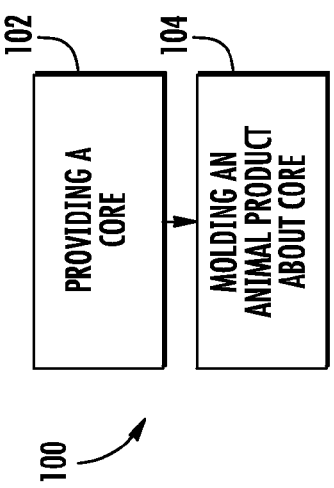
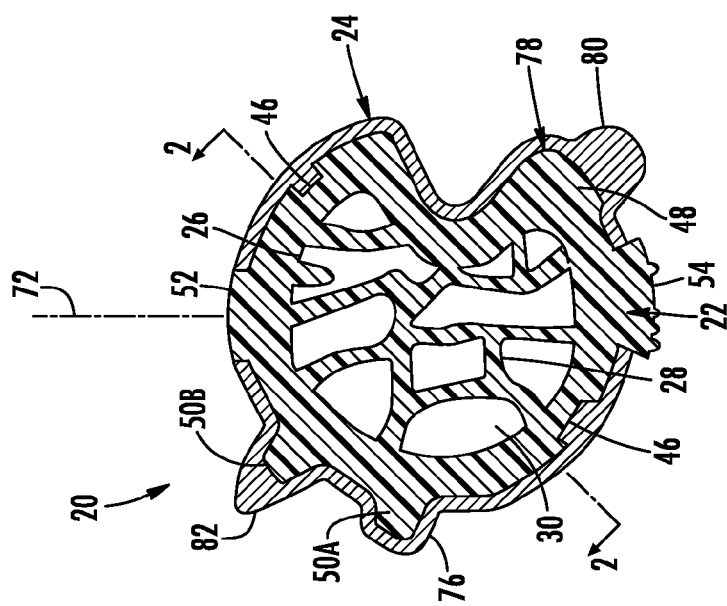
FIG. 1
FIG. 2
FIG. 3

US 9,357,750 B2

PET CHEW TOY

CROSS-REFERENCE TO RELATED PATENT APPLICATIONS

The present application is related to U.S. patent application Ser. No. 29/446,071, now U.S. Pat. No. D709,252, entitled PET CHEW TOY filed on the same day by Nicholas R. Yerten, David C. Woodward and Billy J. Attinger, the full disclosure of which is hereby incorporated by reference. The present application is related to U.S. patent application Ser. No. 29/446,018, now U.S. Pat. No. D692,626, entitled PET CHEW TOY filed on the same day by Nicholas R. Yerten, David C. Woodward and Barbara L. Agnew, the full disclosure of which is hereby incorporated by reference. The present application is related to U.S. patent application Ser. No. 29/446,019, now U.S. Pat. No. D592,627, entitled PET CHEW TOY filed on the same day by Nicholas R. Yerten, David C. Woodward and Barbara L. Agnew, the full disclosure of which is hereby incorporated by reference. The present application is related to U.S. patent application Ser. No. 29/446,020, now U.S. Pat. No. D697,275, entitled PET CHEW TOY filed on the same day by Nicholas R. Yerten, David C. Woodward and Barbara L. Agnew, the full disclosure of which is hereby incorporated by reference.

BACKGROUND

Pet chew toys are often given to pets, such as dogs, to prevent boredom and curb destructive chewing. Such pet chew toys may additionally clean the pet's teeth. Existing pet chew toys typically lack the texture or flavor of animal products such as rawhide and meat.

BRIEF DESCRIPTION OF THE DRAWINGS

FIG. 1 is a sectional view of an example pet chew toy.

FIG. 2 is a sectional view of the pet chew toy of FIG. 1 taken along line 2-2 of FIG. 1.

FIG. 3 is a flow diagram of an example method for forming the pet chew toy of FIG. 1.

DETAILED DESCRIPTION OF THE EXAMPLE EMBODIMENTS

Figure 4:
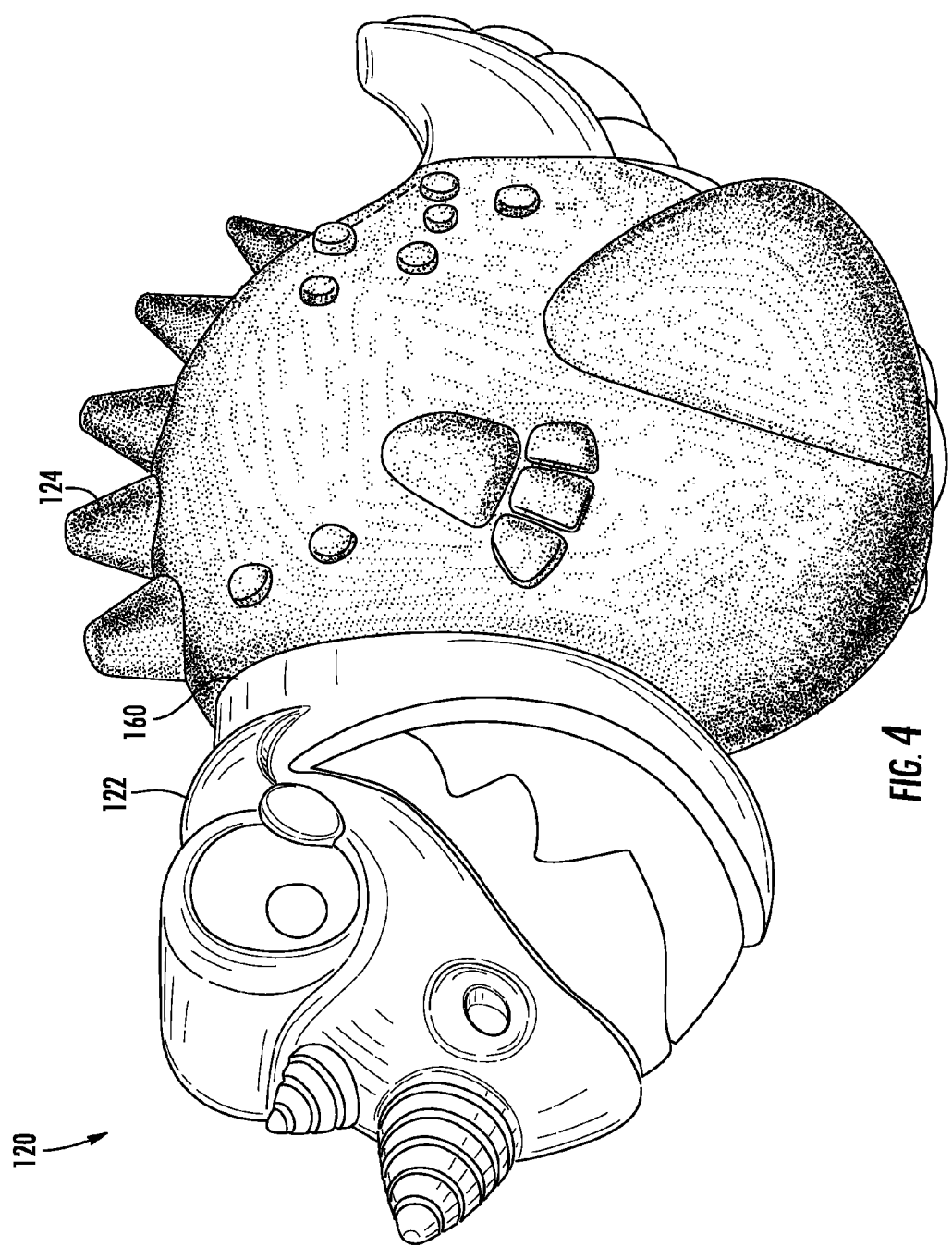
FIG. 4 is a perspective view of an example implementation of the pet chew toy of FIG. 1.

FIGS. 1 and 2 illustrate an example pet chew toy 20. Pet chew toy 20 comprises a core about which a layer of animal product extends. The core provides the pet chew toy with a durable chewable structure while the layer of animal product provides flavor and nutrition. Both the core and the layer of animal product are exposed simultaneously to provide both chewability and flavor along with texture diversity. As will be described hereafter, the core and the layer of animal product cooperate with one another to reliably retain the layer of animal product about the core.

Pet chew toy 20 comprises core 22 and animal product layer 24. Core 22 comprises a structure having a greater durability as compared to animal product layer 24. In one implementation, core 22 is formed from one or more polymeric materials. In one implementation, core 22 has an outer elastomeric surface, allowing the core to be resiliently squeezed or resiliently indented during chewing by a pet, such as a dog. In one implementation, core 22 comprises a single molded polymeric structure. In another implementation, core 22 comprises a polymeric structure far from multiple parts which are joined to one another. For example, multiple parts may be joined to one another by interlocking or mating components, bonding, welding, fastening and the like. In the example illustrated, core 22 has a hollow interior 26, with walls formed from Nylon and having a thickness of at least 1.88 millimeters. In the example illustrated, core 22 additionally comprises internal support walls or ribs 28 extending across and into interior 26. In one implementation, ribs 28 are arranged in a honeycomb pattern or arrangement within interior 26, dividing interior 26 into a multitude of cells 30. The hollow interior reduces the weight of pet chew toy 20 while the ribs 28 provide internal support to inhibit collapsing of core 22.

In other implementations, core 22 may be formed from other materials and may have other internal configurations. For example, in one implementation, core 22 comprises an actual animal bone, wherein the animal product layer 24 is formed about the actual bone. In one implementation, core 22 is solid throughout, lacking interior 26. Although illustrated as generally cylindrical for purposes of illustration, in other implementations, core 22 may have a variety of different sizes, shapes and configurations to enhance that interest. For example, core 22 may alternatively be configured as an animal such as an animal, plant or other real world article. Core 22 may be configured as an animal part, such as in the shape of animal part that typically supports meat. For example, in one implementation, core 22 may be formed in the shape of a rib or in the form of a chicken or turkey leg.

Core 22 comprises several external features which facilitate retention of animal product layer 24. Core 22 comprises layer capturing shoulder 40 (shown in FIG. 2), layer capturing ring 42 (shown in FIG. 2), pass through 44, (shown in FIG. 2), grooves 46 and projections 48, 50A, 50B, 52 and 54. Layer capturing shoulder 40 comprises shoulder formed on an exterior surface of core 22 having an edge 60 to face, abut and contact an opposing edge 62 of animal product layer 24. Layer capturing ring 42 comprises a ring extending about an exterior of core 22 providing an edge 64 to face edge 60 while abutting and contacting an opposing edge 66 of animal product layer 24. As shown by FIG. 2, edges 60, 64 define outer sides of a channel 80 having a floor 82. Edges 60 and 64 cooperate to capture animal product layer 24 therebetween to inhibit sliding movement of layer 24 relative to core 22. Although illustrated as including shoulder 40 and ring 42, in other implementations, core 22 may include a pair of opposing shoulders 40 or a pair of spaced rings 42. In other implementations, one or both of shoulder 40 and ring 42 may be omitted.

Pass through 44 comprises a passage internally through core 22. In one implementation, pass through 44 extends from a first side to a second opposite side of core 22, substantially perpendicular to a longitudinal axis of core 22. In another implementation, pass through 44 forms a U-turn, entering and exiting core 22 along a same side of core 22. As shown by FIG. 2, pass through 44 has a first mouth 86 at a first end of pass through 44 and a second mouth 88 at a second end of pass through 44. Each of mouths a six, 88 is located along the floor 82 of channel 80. As shown by 2, animal product layer 24 continuously extends within channel 80 through pass through 88, outwardly beyond exterior sides of each of mouths 86, 88. Pass through 44 receives animal product layer 24 to interlock animal product layer 24 to core 22. Those portions of animal product layer 24 contained within pass through 44 provide flavor for chew toy 20 after the more accessible exterior portions of animal product layer 24 have been removed or consumed. In yet other implementations, pass through 44 is omitted.

Grooves 46 (shown in FIG. 1) comprise depressions, channels, serrations, indentations and/or the like extending into the exterior surface of core 22. Grooves 46 receive animal product layer 24 to provide a greater surface area to core 22 for retention of animal product layer 24. In one implementation, grooves 46 are completely filled with animal product layer 24. Grooves 46 further form shoulders and edges which inhibit sliding movement of animal product layer 24 relative to core 22. In some implementations, grooves 46 may be omitted.

Projections 48 (shown in FIG. 1) comprise ribs, tongues, walls or other three-dimensional structures outwardly extending from the exterior of core 22. Projections 48 provide greater surface area contact between core 22 and animal product layer 24. Projections 48 additionally provide shoulders or edges which inhibit sliding movement of animal product layer 24 relative to core 22. In the example illustrated, each of projections 48 has a height extending away from surrounding exterior surfaces of core 22 that is less than a thickness of animal product layer 24, wherein animal product layer 24 extends over and about the projection 48 such that projection 48, itself, does not impact the exterior texture or ornamentation of animal product layer 24. In other words, none of the profile of projection 48 is reflected in the overlying profile of animal product layer 24. As a result, projection 48 may be configured to provide enhanced gripping and securement of animal product layer 24 while animal product layer 24 may be provided with a completely different texture or ornamentation, potentially more attractive, potentially corresponding to the theme of core 22 and potentially offering a more orally stimulating texture.

In one implementation, each of projections 48 has a height of at least 1 millimeter, nominally of at least 3 millimeters and more nominally of at least 5 millimeters. With such a height, projections 48 provide sufficiently strong additional retention of animal product layer 24 to provide enhanced retention given the anticipated chewing forces upon pet chew toy 20. In one implementation, ridges 48 and/or grooves 46 cover at least 5% and nominally at least 40% of the exterior of core 22 to provide enhanced retention of layer 24 despite the forces encountered during pet chewing. In other implementations, projection 48 may have other height and coverage characteristics.

Projections 50A, SOB (collectively referred to as projections 50) comprise ribs, tongues, walls or other three-dimensional structures outwardly extending from the exterior of core 22. Projections 50 provide greater surface area contact between core 22 and animal product layer 24. Projections 50 additionally provide shoulders or edges which inhibit sliding movement of animal product layer 24 relative to core 22. Unlike projections 48, projections 50 have a height greater than a thickness of the overlying portion of animal product layer 24. As a result, projections 48 assist in providing the exterior of animal product layer 24 with a texture, shape or other configuration. Projections 48 serve as a support structure to assist in maintaining the particular texture shape along the exterior of animal product layer 24. For example, projections 48 may inhibit a three-dimensional projection along the exterior panel product layer 24 from being torn away or broken off. As illustrated with respect to projection 50A, the entire three-dimensional surface texture or shape along the exterior pet chew 20 may be defined by the underlying projections 50, wherein the overlying animal product layer 24 is simply a continuous, flat layer of material that parallels the underlying shape of core 22 and projections 50. As illustrated with respect to projection 50B, the overlying animal product layer 24 is itself molded or otherwise shaped (other than a flat layer) to provide additional three-dimensional detail. The underlying projection 50B serves as a foundation for the overall exterior three-dimensional structure or detail, allowing the overall exterior three-dimensional structure or detail to have a greater height or greater degree of contrast with respect to surrounding regions of the exterior of toy 20, while utilizing less animal product. Although projections 50 are illustrated as bumps, in other implementations, projections 50 may have other shapes and configurations.

Projection 52 comprises a rib, tongue, wall or other three-dimensional structure outwardly extending from the exterior of core 22. Projection 52 provides greater surface area contact between core 22 and animal product layer 24. Projection 52 additionally provide shoulders or edges which inhibit sliding movement of animal product layer 24 relative to core 22. Unlike projections 48 and 50, projection 52 extends through animal product layer 24 so as to be surrounded by animal product layer 24 while being exposed along an exterior of pet chew toy 20. As a result, portions of core 22 are exposed in two directions: a first direction along a longitudinal axis 70 of pet chew toy 20 as shown in FIG. 2 and a second direction along a transverse axis 72 non-parallel to and nominally perpendicular to the axis 70. The exposure of core 22 in multiple orthogonal directions provides enhanced durability during chewing regardless of the orientation of chew toy 20 when being chewed.

Moreover, because projection 52 is surrounded by animal product layer 24, the contrast between projection 52 and the different animal product layer 24 highlight or emphasize projection 52. As a result, surface details or product identification placed upon the exterior projection 52 are also discernible to a greater extent. In addition to facilitating retention of animal product layer 24, projection 52 further provides pet chew toy 20 with enhanced color contrast and enhanced logo, product name or trademark distinctiveness or conspicuousness when the product identification is formed upon or defined by projection 52.

Projection 54 is similar to projection 52 except that projection 54 extends or projects outwardly beyond animal product layer 24. As a result, projection 54 provides additional surface height and surface three dimensionality surrounded by animal product layer 24. In some implementations, projections 48, 50, 52 and 54 are omitted.

Animal product layer 24 comprises a layer of animal product provided about core 22. In one implementation, the animal product forming animal product layer 24 comprises animal rawhide, such as beef hide, of which about 50% is protein. In one implementation, the animal product forming animal product layer 24 comprises ground rawhide particles bonded to one another by one or more additives to form layer 24. In one implementation, the animal product forming animal product layer 24 comprises animal meat, dried or ground and dried. For example, animal product layer 24 may comprise a beef-jerky type layer. In some implementations, layer 24 may include additional additives. Such additives may comprise additives to join ground animal product, to provide nutritional supplement or to provide medicinal treatment. In some implementations, additional flavor enhancing, medicinal enhancing or nutritional enhancing coatings, either transparent, semi-transparent or opaque, may be coated over animal product layer 24, over exposed portions of core 22 or over both animal product layer 24 and exposed portions of core 22.

In the example illustrated, animal product layer 24 comprises ground animal product which is pressed and molded over portions of core 22. As a result, animal product layer 24 completely fills depressions or grooves along the exterior of core 22 and more closely conforms to and contacts a greater surface area of core 22 for enhanced securement retention of layer 24 about core 22. In addition, because animal product layer 24 comprises ground animal product particles which collectively form an amorphous mass during molding, animal product layer 24 itself may be provided with comlex three dimensionality and shapes independent of the underlying three dimensionality and shape of core 22.

In the example shown in FIG. 1, animal product layer 24 comprises base 76, grooves 78 and projections 80, 82. Base 76 comprises a base portion or foundation of layer 24. As shown by FIG. 1, and those portions where base 76 does not include any projections, base 76 parallels the underlying surface of core 22. Those portions of base 76 extending over projection 50A have a three-dimensional shape corresponding to the underlying shape and location of projection 50A.

Grooves 78 comprise recesses on the inside surface of layer 24 facing core 22. Grooves 78 received projections 48. During molding of material layer 24 over projections 48, grooves 78 are formed, wherein grooves 78 match in size and shape to projections 48 to interlock with projections 48.

Projection 80 extends above one of grooves 78 and above base 76 to provide three-dimensional protruberances and details distinct from that of the underlying core 22. Projection 82 extends over projection 50B and provide three-dimensional protruberances and details different from that of the underlying core 22. In one implementation, projection 82 exaggerates an amplitude or height of projection 50B. In some implementations, one or both the projections 80, 82 may be omitted.

Although animal product layer 24 is described as being molded about core 22, in other implementations, animal product layer 24 is wrapped about core 22. In the example illustrated, animal product layer 24 is molded completely about core 22 so as to encircle or completely extend around core 22 with respect axis 70. As a result, animal product layer 24 is securely retained with respect to core 22, lacking continuous breaks wherein product layer 22 may be separated from core 22. In one implementation, pet chew toy 20 omits each of the above described retention features, wherein animal product layer 24 is retained with respect to core 22 by the complete encircling of animal product layer 24 about core 22. In some implementations, pet chew toy 20 may retain animal product layer 24 with respect to core 22 by relying upon the complete encircling of animal product layer 24 about core 22 in combination with one or more of the other retention features described above. In other implementations, animal product layer 24 only partially extends about core 22 with respect axis 70.

FIG. 3 is a flow diagram of an example method 100 for forming pet chew toy 20. As indicated by step 102, core 22 is provided. As noted above, core 22 may be molded, form through material removal techniques and/or assembled. Core 22 may include one or more of the aforementioned retention structures.

As indicated by step 104, animal product is molded about core 22 to form layer 24. In one implementation, animal product layer 24 completely extends about core 22. In another implementation, animal product layer 24 partially extends about core 22. Animal product layer 24 is formed so as to cooperate with retention features of core 22 which assists in retaining animal product layer 24 on core 22 during chewing of pet chew toy 20.

Figure 5:
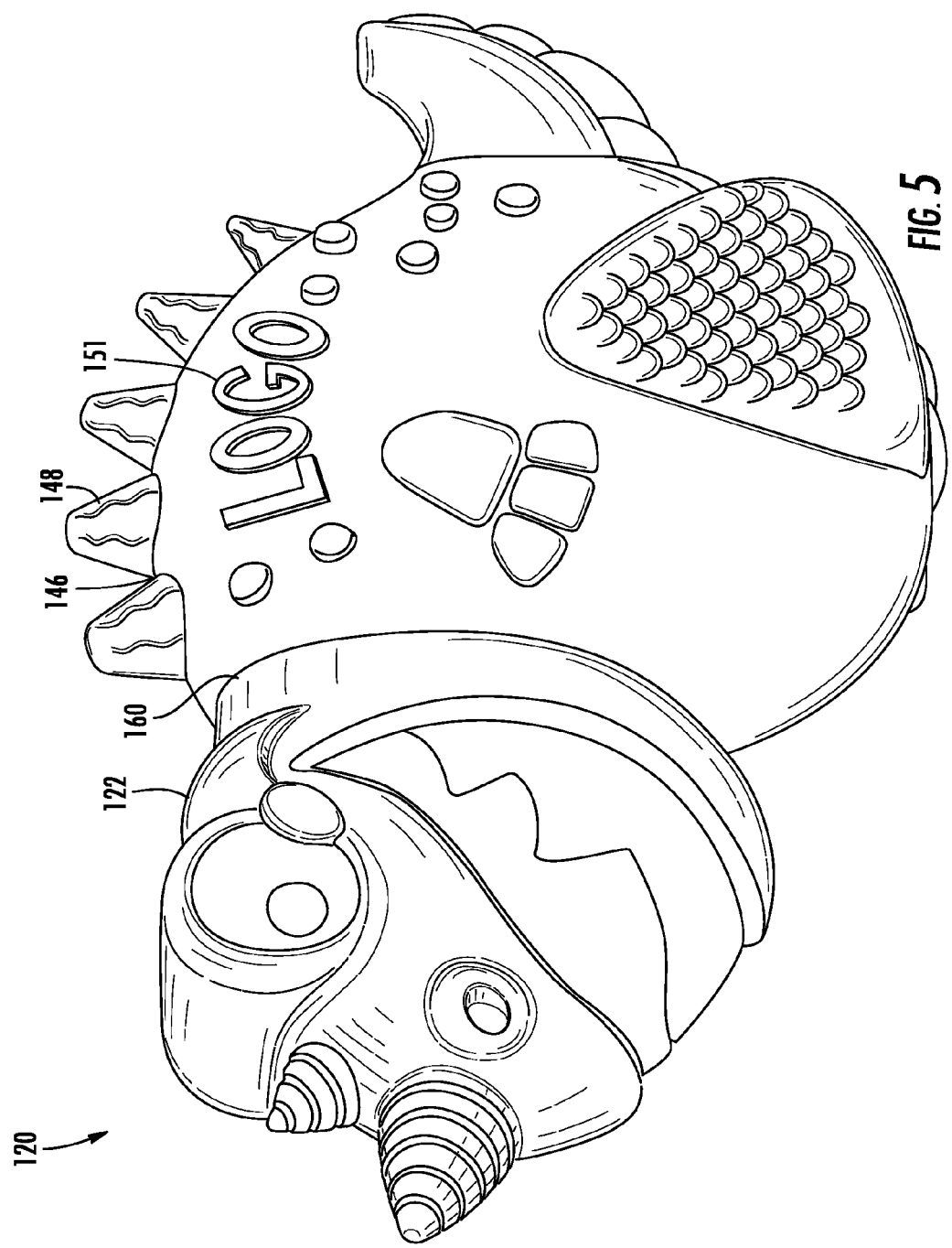
FIG. 5 is a perspective view of an example core of the pet chew toy of FIG. 4.

FIG. 4 illustrates pet chew toy 120, an example implementation of pet chew toy 20. Pet chew toy 120 comprises core 122 and animal product layer 124. Core 122 and animal product layer 124 are similar to core 22 and animal product layer 124 with respect to the material or materials used to form core 122 and animal product layer 124. FIG. 5 illustrates core 122 prior to core 122 being partially surrounded by animal product layer 124. As shown by FIG. 5, core 122 comprises a plurality of projections 148 transversely extending across core 122. Projections 148, shown as ribs, project parallel to one another to form corresponding intervening grooves 146.

As further shown by FIG. 5, core 122 comprises a display region 151 which underlies animal product layer 124 in which is covered by an concealed by animal product layer 124. In addition to having surface undulations or irregularities providing enhanced surface area for contacting in retaining animal product layer 124 in place, display region 151 provides product information in the form of a logo, trademark, product name or the like. As a result, once animal product layer 124 has been removed or consumed, display region 151 becomes exposed, providing a reminder of the source of the pet chew toy so enjoyed by an owner's pet. Even though pet chew toy 20 still functions as a chew toy after removal or consumption of animal product layer 124, exposure of display region 151 may suggest purchase of a new pet chew toy 120. In some implementations, a chew toy 120 may be recycled by having a new animal product layer 124 remolded or rewrapped about core 122.

As shown by FIG. 4, animal product layer 124 overlies grooves 146 and projections 148 and has an exterior surface configuration distinct from that of grooves 146 and ribs 148. Animal product layer 124 completely extends about core 122 and is axially captured upon core 122 in one direction by edges 160. In other implementations, pet chew toy 120 may comprise one or more of the retention features described above with respect to a chew toy 20.

Figure 6:
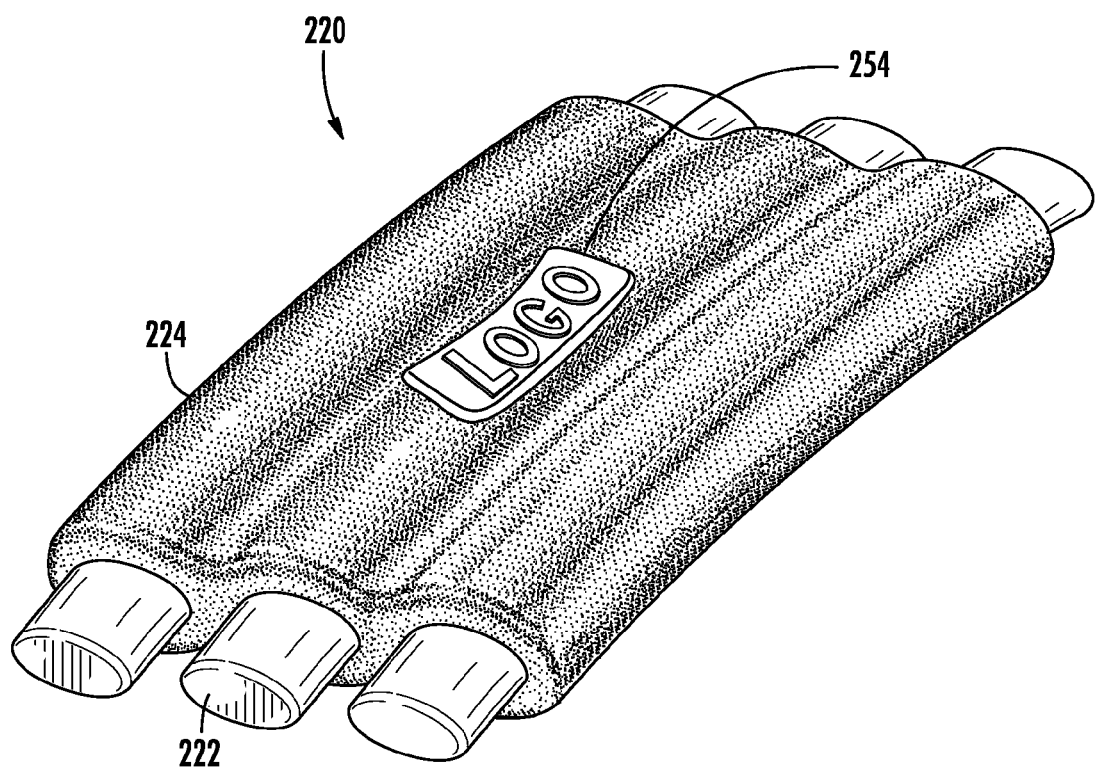
FIG. 6 is a perspective view of an example implementation of the pet chew toy of FIG. 1.
Figure 7:
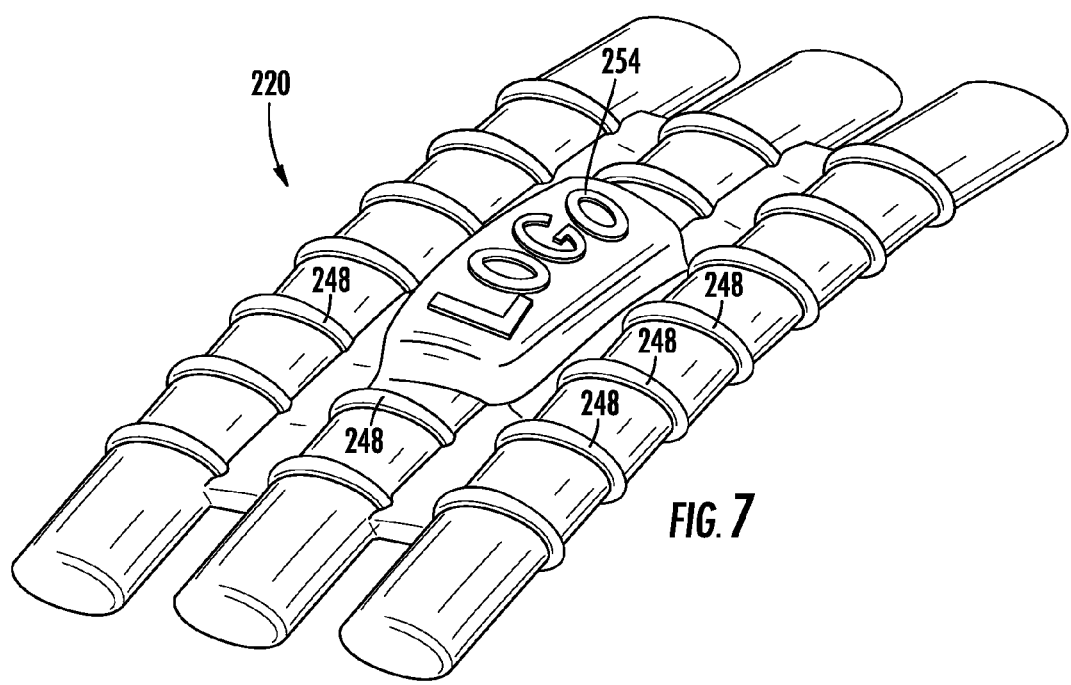
FIG. 7 is a perspective view of an example core of the pet chew toy of FIG. 6.

FIGS. 6 and 7 illustrate pet chew toy 220, another example implementation of pet chew toy 220. Pet chew toy 220 comprises core 222 and animal product layer 224. Core 222 and animal product layer 224 are similar to core 22 and animal product layer 24 with respect to the material or materials and fabrication technique used to form core 222 and animal product layer 224. FIG. 7 illustrates core 222 prior to core 222 being partially surrounded by animal product layer 224. As shown by FIG. 7, core 222 comprises a plurality of projections 248 transversely extending across core 222. Projections 248, shown as ribs, project parallel to one another.

As further shown by FIG. 7, core 222 comprises projection 254 which projects through an opening in animal product layer 224. As a result, portions of core 222 are exposed in two directions: a first direction along a longitudinal axis of pet chew toy 20 and a second direction non-parallel to and nominally perpendicular to the longitudinal axis. The exposure of core 222 in multiple orthogonal directions provides enhanced durability during chewing regardless of the orientation of chew toy 220 when being chewed.

Moreover, because projection 254 is surrounded by animal product layer 224, the contrast between projection 254 and the different animal product layer 224 highlight or emphasize projection 254. As a result, surface details or product identification placed upon the exterior projection 254 are also discernible to a greater extent. In addition to facilitating retention of animal product layer 224, projection 254 further provides pet chew toy 220 with enhanced color contrast and enhanced logo, product name or trademark distinctiveness or conspicuousness when the product identification is formed upon or defined by projection 254.

As shown by FIG. 6, animal product layer 224 overlies projections 248 and has an exterior surface configuration distinct from that of projections 248. Animal product layer 224 completely extends about core 222. In other implementations, pet chew toy 220 may comprise one or more of the retention features described above with respect to a chew toy 220.

Figure 8:
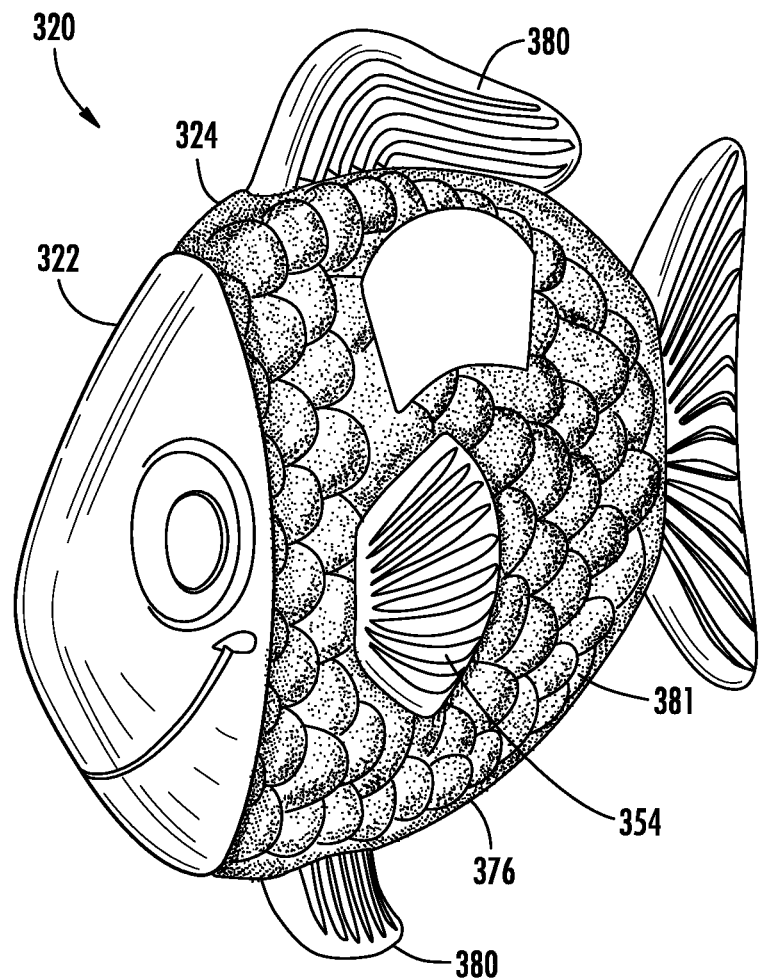
FIG. 8 is a perspective view of an example implementation of the pet chew toy of FIG. 1.
Figure 9:
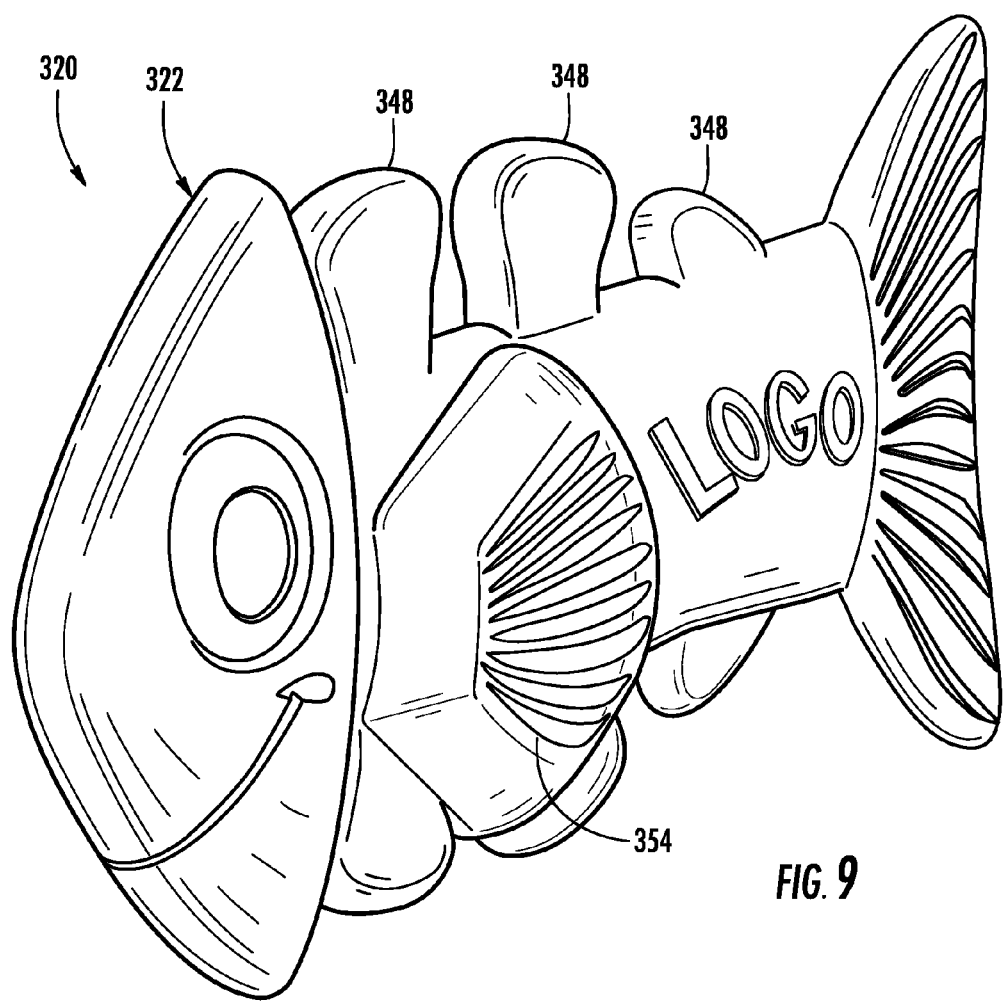
FIG. 9 is a perspective view of an example core of the pet chew toy of FIG. 8.

FIGS. 8 and 9 illustrate pet chew toy 320, another example implementation of pet chew toy 320. Pet chew toy 320 comprises core 322 and animal product layer 324. Core 322 and animal product layer 324 are similar to core 22 and animal product layer 24 with respect to the material or materials and fabrication technique used to form core 322 and animal product layer 324. FIG. 9 illustrates core 322 prior to core 322 being partially surrounded by animal product layer 324. As shown by FIG. 9, core 322 comprises a plurality of projections 348. As shown by FIG. 9, projections 348 are the shape of an animal backbone, spine or other skeletal structure. As a result, once animal product layer 324 has been removed from core 322 and/or consumed, the underlying core 322, which is fully exposed, still resembles the theme of pet chew toy 320. In the example illustrated, pet chew toy 320 is in the form of a fish. Removal or consumption of animal product layer 324 results in exposure of projections 348 which represent the skeleton of the fish. The remainder of chew toy 320 now corresponds to a fish skeleton, facilitating further use of pet chew toy 320, wherein pet chew toy 320 is not necessarily seen as being broken or incomplete.

As further shown by FIG. 8, core 322 comprises projection 354 which projects through an opening in animal product layer 324. As a result, portions of core 322 are exposed in two directions: a first direction along a longitudinal axis of pet chew toy 320 and a second direction non-parallel to and nominally perpendicular to the longitudinal axis. The exposure of core 322 in multiple orthogonal directions provides enhanced durability during chewing regardless of the orientation of chew toy 320 when being chewed.

Moreover, because projection 354 is surrounded by animal product layer 324, the contrast between projection 354 and the different animal product layer 324 highlight or emphasize projection 354. As a result, surface details or product identification placed upon the exterior projection 354 are also discernible to a greater extent. In addition to facilitating retention of animal product layer 324, projection 354 further provides pet chew toy 320 with enhanced color contrast.

As shown by FIG. 8, animal product layer 324 extends completely about core 322. Animal product layer 324 includes unsupported projections 380 projecting from a base 376 of layer 324. In the example illustrated, animal product layer 324 further includes a surface texture 381 corresponding to the animal or other object represented by pet chew toy 320. In the example illustrated, surface texture 381 is in the form of scales. Because animal product layer 324 is formed by molding ground animal product about core 322, surface texture 381 may be molded onto core 322. In other implementations, surface texture 381 may be stamped onto or etched into the exterior of animal product layer 324.

Figure 10:
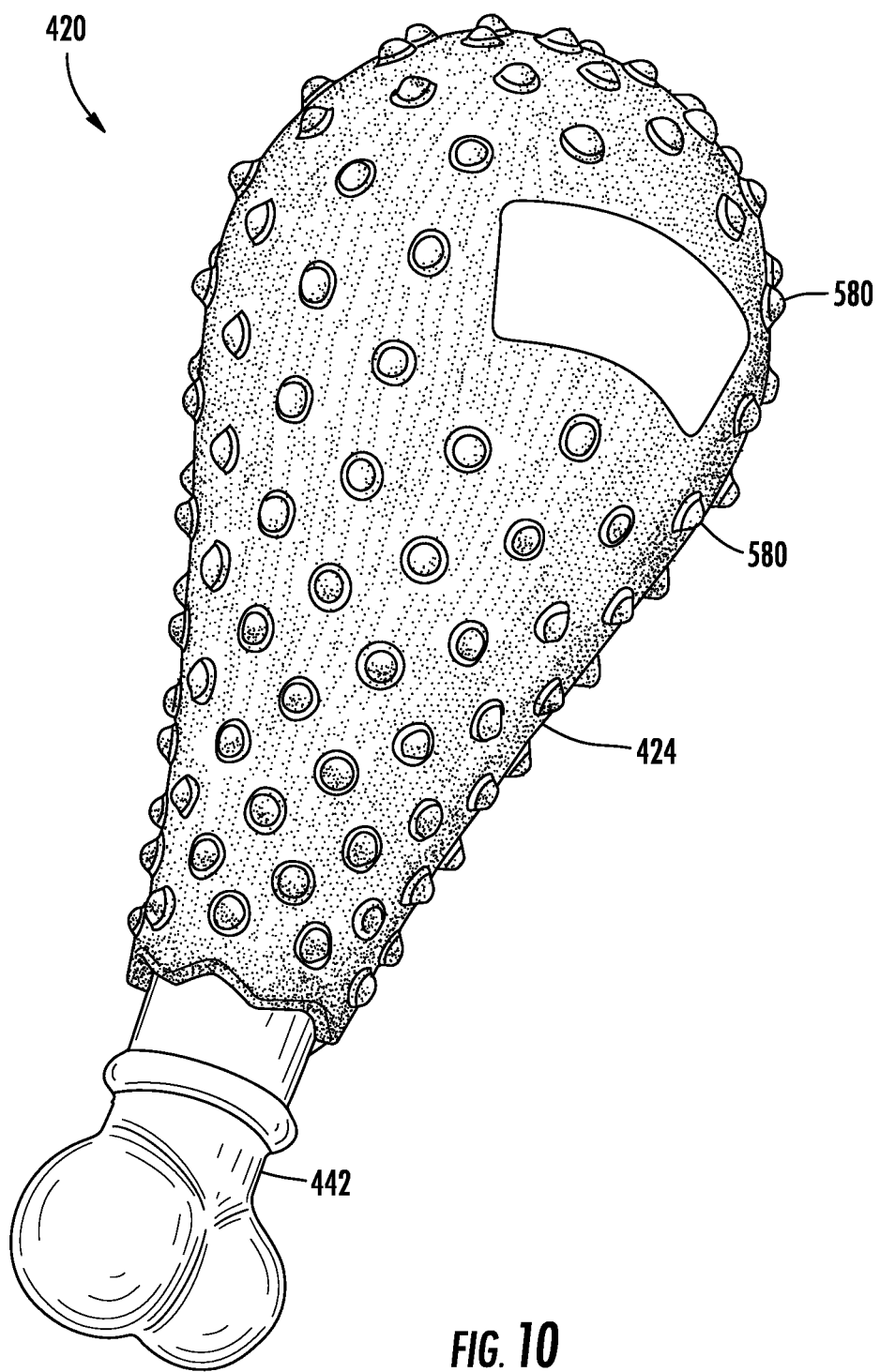
FIG. 10 is a perspective view of an example implementation of the pet chew toy of FIG. 1.
Figure 11:
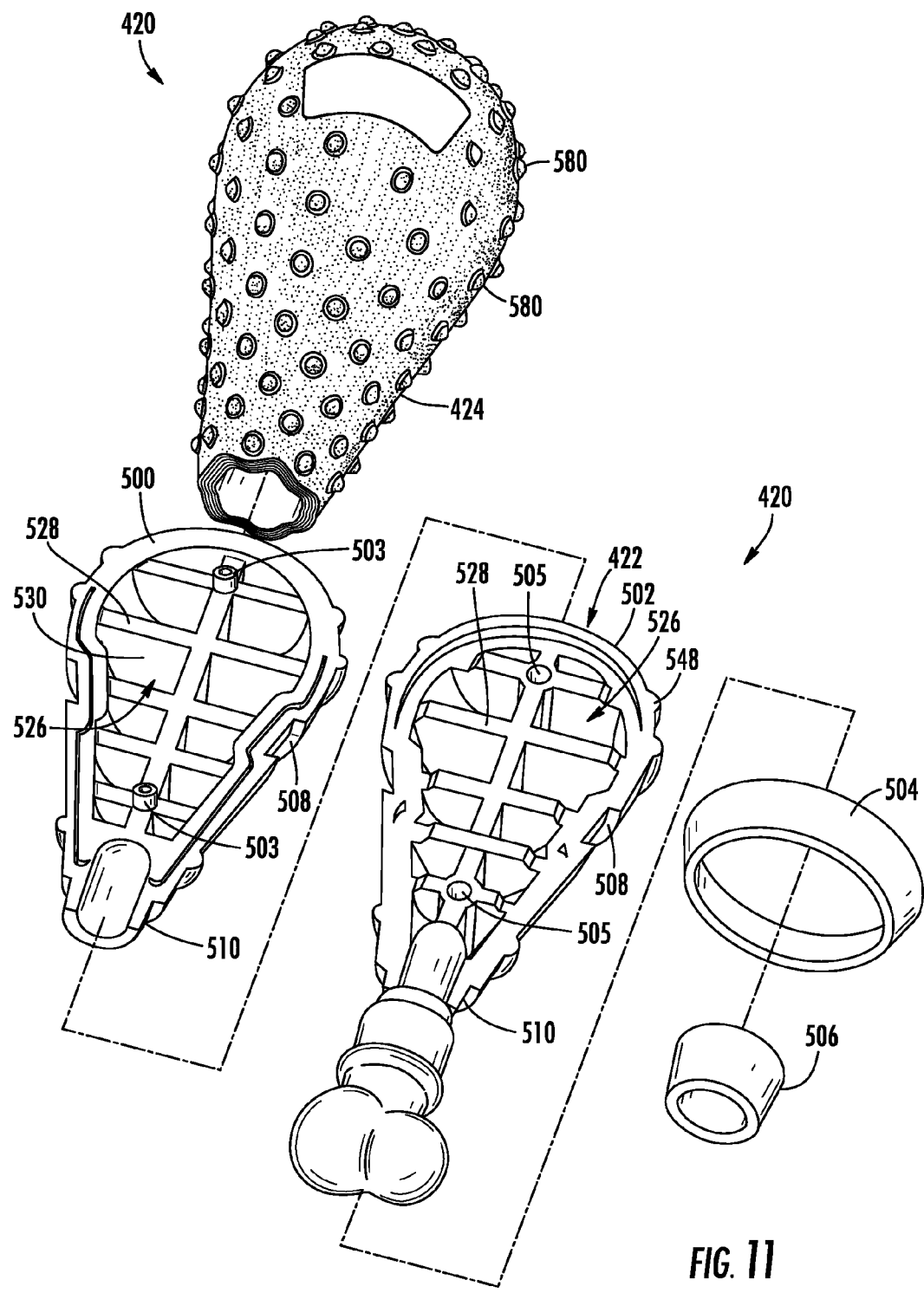
FIG. 11 is an exploded perspective view of the pet chew toy of FIG. 10.
Figure 12:
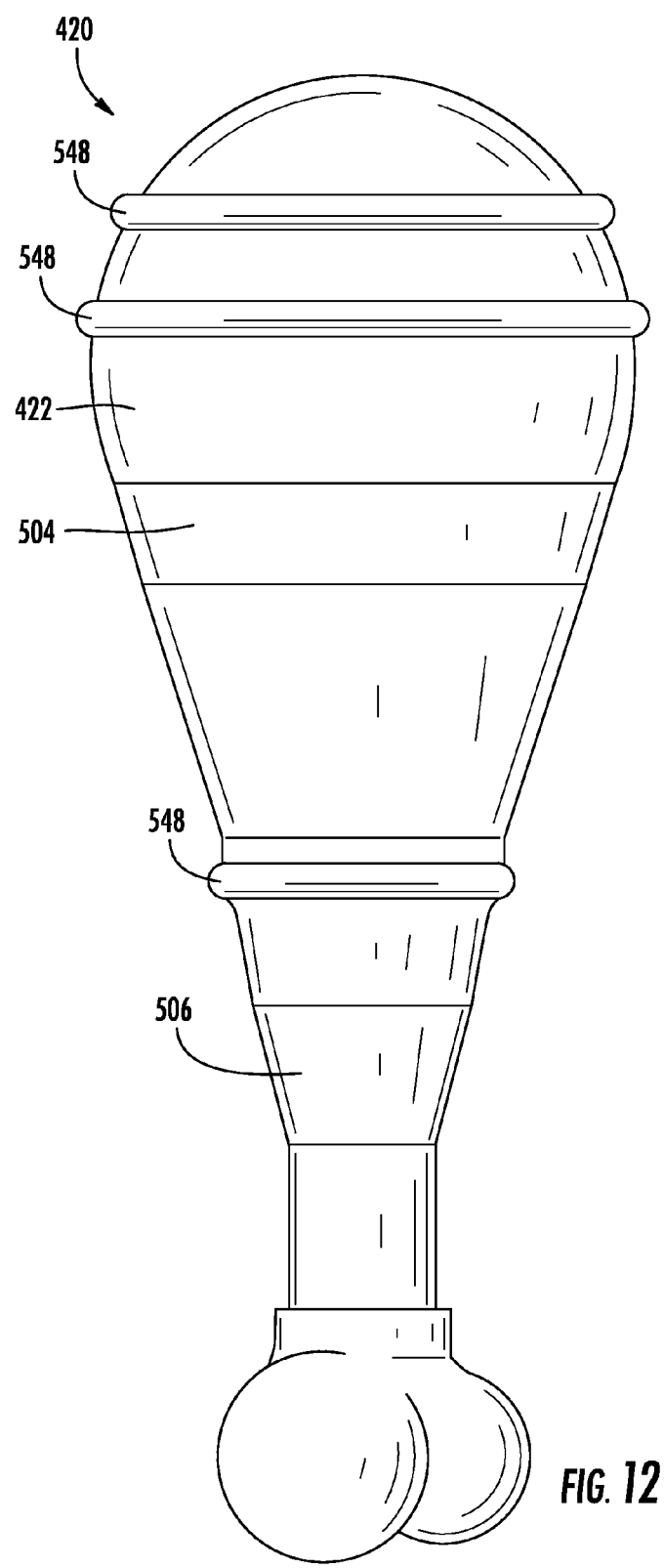
FIG. 12 is a perspective view of an example core of the pet chew toy of FIG. 10.

FIGS. 10 and 11 illustrate pet chew toy 420, another example implementation of pet chew toy 20. Pet chew toy 420 comprises core 422 and animal product layer 424. Core 422 and animal product layer 424 are similar to core 22 and animal product layer 24 with respect to the material or materials used to form core 422 and animal product layer 424. FIG. 11 is an exploded perspective view illustrating pet chew toy 420. FIG. 12 illustrates core 422 after assembly the prior to the provision of animal product layer 424. As shown by FIG. 11, core 422 comprises a multi-piece construction or assembly comprising core halves or portions 500, 502 and assembly bands 504, 506. Portions 500 and 502 are configured to join to one another to form the completed core shown in FIG. 12. In the example illustrated, portion 500 includes posts 503 which fit within corresponding bores 505 in portion 502. In other implementations, such interlocking features may be omitted.

Bands 504, 506 encircle portions 500 502 to retain portions 500 502 in a joined state. In one implementation, bands 504, 506 are molded within corresponding channels or grooves 508, 510, respectively, of portions 500 502. In another implementation, 504, 506 are sufficiently elastic so as to be stretched to allow positioning of bands 504, 506 along the join portions 500, 502 until such bands 504, 506 are located within channels 508, 510, respectively. In other implementations, bands 504, 506 may be omitted. In other implementations, portions 500 502 may be joined in other fashions such as through the use of adhesives, welding, material fusion and the like.

As further shown by FIG. 11, each of portions 500, 502 has a hollow interior 526 in which support walls 528 project or extend. In one implementation, walls 528 are arranged in a honeycomb pattern or arrangement within interior 526, dividing interior 526 into a multitude of cells 530. The hollow interior reduces the weight of pet chew toy 420 while the walls 528 provide internal support to inhibit collapsing of core 422. In other implementations, portions 500, 502 may be solid.

As shown by FIG. 12, each of portions 500, 502 include circumferentially extending projections 548. Projections 548 comprise ribs, tongues, walls or other three-dimensional structures outwardly extending from the exterior of core 422. Projections 548 provide greater surface area contact between core 422 and animal product layer 424. Projections 548 additionally provide shoulders or edges which inhibit sliding movement of animal product layer 424 relative to core 422. In the example illustrated, each of projections 548 has a height extending away from surrounding exterior surfaces of core 422 that is less than a thickness of animal product layer 424, wherein animal product layer 424 extends over and about the projection 548 such that projection 548, itself, does not impact the exterior texture or ornamentation of animal product layer 424. In other words, none of the profile of projection 548 is reflected in the overlying profile of animal product layer 424. As a result, projection 548 may be configured to provide enhanced gripping and securement of animal product layer 424 while animal product layer 424 may be provided with a completely different texture or ornamentation, potentially more attractive, potentially corresponding to the theme of core 422 and potentially offering a more orally stimulating texture. In the example illustrated, the exterior of animal product layer 424 is provided with protruberances or bumps 580, providing an enhanced texture and correspond to bumps that may be found on the article simulated by pet chew toy 420, bumps on the skin of a chicken leg.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A pet chew toy comprising:
    a core; and
    an animal product layer encircling the core;
    wherein exterior portions of the pet chew toy include exterior portions of the core, the core forming opposing edges that mutually face one another and that capture portions of the layer that extend on top of underlying portions of the core such that the core forms a channel having a floor extending between and interconnecting the opposing edges and recessed with respect to the opposing edges, the channel receiving the portions of the layer between the opposing edges and on top of the floor, wherein a top surface of the portions of the layer received within the channel extends opposite the floor and forms an exterior surface of the pet chew toy; and
    a pass through extending completely through the core and completely surrounded by the core but for a first mouth at a first end of the pass through and a second mouth at a second end of the pass through, the first mouth located in the floor of the channel between the opposing edges, wherein the layer extends completely through the pass through, through each of the first mouth and the second mouth and wherein the layer extends from the first mouth outwardly beyond exterior sides of the first mouth to at least partially fill the first channel on top of the core forming the floor of the channel.

2. The pet chew toy of claim 1, wherein the core is polymeric.

3. The pet chew toy of claim 1, wherein the layer is molded about the core.

4. The pet chew toy of claim 1, wherein the core comprises a first textured surface and wherein the layer has a second textured surface overlying the first textured surface and corresponding in shape and location to the first textured surface.

5. The pet chew toy of claim 4, wherein the layer has a three-dimensional exterior surface.

6. The pet chew toy of claim 1, wherein the animal product layer comprises rawhide.

7. The pet chew toy of claim 1, wherein the core has an external surface comprising one of grooves and ribs and wherein the layer has an internal surface comprising the other of grooves and ribs corresponding in location to said one of the grooves and ribs.

8. The pet chew toy of claim 1, wherein the core projects beyond the layer in a first direction.

9. The pet chew toy of claim 8, wherein the core projects beyond the layer in a second direction perpendicular to the first direction.

10. The pet chew toy claim 1, wherein the core comprises an external ring opposing an edge of the layer.

11. The pet chew toy of claim 1, wherein the core has a hollow interior, the core comprising support walls extending into the hollow interior.

12. The pet chew toy of claim 11, wherein the support walls form a honeycomb pattern on the interior.

13. A method comprising:
    forming a core having a pass through extending through and completely surrounded by the core, the pass through having a first mouth at a first end of the pass through and a second mouth at a second end of the pass-through, wherein each of the first mouth and the second mouth are at a recessed bottom of a channel formed in the core and wherein the core further comprises exterior portions included in an outer surface of a pet chew toy, the exterior portions of the core forming opposing edges; and
    molding an animal product about the core and continuously through the pass through and outwardly beyond exterior sides of each of the first mouth and the second mouth so as to extend across and on top of the core between the opposing edges, wherein the animal product is captured between the opposing edges with portions of the core externally exposed with respect to the animal product, forming part of an exterior of the pet chew toy.

* * * * *